(12) United States Patent
Li et al.

(10) Patent No.: US 10,970,805 B2
(45) Date of Patent: Apr. 6, 2021

(54) GRAPHICS PROCESSING UNIT OPERATION

(71) Applicant: INTEL CORPORATION, Santa Clara, CA (US)

(72) Inventors: Yuanyuan Li, Shanghai (CN); Hai Bai, Hangzhou (CN); Guizi Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 15/779,368

(22) PCT Filed: Dec. 6, 2016

(86) PCT No.: PCT/US2016/065129
§ 371 (c)(1),
(2) Date: May 25, 2018

(87) PCT Pub. No.: WO2017/112403
PCT Pub. Date: Jun. 29, 2017

(65) Prior Publication Data
US 2020/0302568 A1 Sep. 24, 2020

Related U.S. Application Data

(66) Substitute for application No. PCT/US2015/000405, filed on Dec. 24, 2015.

(51) Int. Cl.
*G06F 15/16* (2006.01)
*G06T 1/20* (2006.01)
(Continued)

(52) U.S. Cl.
CPC .............. *G06T 1/20* (2013.01); *G06F 9/3836* (2013.01); *G06F 9/48* (2013.01); *G06F 9/5027* (2013.01); *G06F 9/5066* (2013.01)

(58) Field of Classification Search
CPC . G06T 15/005; G06F 16/24549; G06F 16/35; G06F 1/329; G06F 2209/5017; G06F 2209/503; G06F 8/453; G06F 9/5083
See application file for complete search history.

(56) References Cited

U.S. PATENT DOCUMENTS

| 8,259,119 B1* | 9/2012 | Diard | G06F 1/3293 345/502 |
| 2012/0081373 A1* | 4/2012 | Li | G06F 9/4893 345/520 |
| 2013/0191612 A1* | 7/2013 | Li | G06T 15/005 712/30 |

FOREIGN PATENT DOCUMENTS

| CN | 102866918 A | 1/2013 |
| CN | 104536937 A | 4/2015 |
| WO | 2017112403 | 6/2017 |

OTHER PUBLICATIONS

Zhai et al. "Lit: A High Performance Massive Data Computing Framework Based on CPU/GPU Cluster" retrieved from IEEE Xplore (Year: 2013).*

(Continued)

*Primary Examiner* — Hau H Nguyen
(74) *Attorney, Agent, or Firm* — Schwegman Lundberg & Woessner, P.A.

(57) ABSTRACT

A system and method for distributed computing including a compute node having a graphics processing unit (GPU) to execute tasks of a distributed computing job. A distributed-computing programming framework executes the tasks on the compute node. A GPU-daemon process shares GPU resources between the tasks executing on the GPU of the compute node.

25 Claims, 7 Drawing Sheets

(51) Int. Cl.
    *G06F 9/38*         (2018.01)
    *G06F 9/48*         (2006.01)
    *G06F 9/50*         (2006.01)

(56) References Cited

OTHER PUBLICATIONS

International Search Report for International PCT Application No. PCT/US2016/065129 dated Mar. 9, 2017, 2 pages.
Li, Teng, et al; "Efficient Resource Sharing Through GPU Virtualization on Accelerated High Performance Computing Systems"; Cornell University Library, NSF Center for High-Performance Reconfigurable Computing (CHREC), Department of Electrical and Computer Engineering, The George Washington University, Washington, DC; 21 pages.
Li, Hui, "Co-Processing SPMD Computation on CPUs and GPUs Cluster"; School of Informatics and Computing, Pervasive Technology Institute, Indiana University Bloomington; 2013 IEEE International Conference, Sep. 2013, 10 pages.
"International Application Serial No. PCT US2016 065129, Written Opinion dated Mar. 9, 2017", 10 pgs.
"International Application Serial No. PCT US2016 065129, International Preliminary Report on Patentability dated Jul. 5, 2018", 12 pgs.

\* cited by examiner

GRAPHICS PROCESSING UNIT OPERATION

CROSS REFERENCE TO RELATED APPLICATIONS

Pursuant to 35 U.S.C. § 371, this application is the United States National Stage Application of International Patent Application No. PCT/US2016/065129, filed on Dec. 6, 2016, by INTEL CORPORATION, entitled "GRAPHICS PROCESSING UNIT OPERATION", and which is incorporated herein by reference; which is a Substitute Application of PCT Patent Application Serial No. PCT/US2015/000405, by INTEL CORPORATION, entitled "GRAPHICS PROCESSING UNIT OPERATION," filed Dec. 24, 2015.

TECHNICAL FIELD

The present techniques relate generally to graphics processing units, and more particularly, to distributed computing utilizing graphics processing units.

BACKGROUND ART

Distributed computing systems, high performance computing (HPC) systems, and other similar systems may facilitate scientists and engineers to solve complex science, engineering, and business problems using applications that benefit from high bandwidth, low latency networking, and very high compute capabilities. These systems may also execute data storage and retrieval, perform more straightforward tasks, and so on. Such systems may include those for cloud computing, Big Data analytics, web services, enterprise services, distributed computing and HPC generally, and so on. The competitive business of data and computing services drives manufacturers in the continuous improvement of their processes and products in order to lower costs, deliver reliable service, increase speed, and so on. Indeed, in data handling and processing, there is generally an ever-increasing demand to utilize processing resources more efficiently, including in the "Big Data" era.

Big Data is a term used to describe the exponential growth and availability of data, both structured and unstructured. Big Data may be a term for collection of data sets so large and complex that processing is difficult using traditional data processing applications. Big Data may also mean that the amount or size of data is larger than the memory capacity or storage capacity of a single machine and, hence, multiple machines/servers/computers are employed to process the data or solve the problem. With the advent of Big Data, challenges include analysis, capture, curation, search, sharing, storage, transfer, visualization, and so on. Again, there exists a need for continuous improvement in efficiency of data storage and processing, including with regard to large amounts of data such as Big Data and data system configurations generally.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Embodiments of the present techniques relate generally to distributed computing, graphic processing units (GPUs), and a GPU-Daemon process or service. Embodiments execute distributed computing jobs by GPUs on compute nodes of a distributed computing system. In examples, the GPU-Daemon process shares GPU resources between the tasks executing on a GPU of a given physical compute node. In particular examples, the GPU-Daemon process may be loaded in the background of an application, such as at start of an operating system.

The GPU on the nodes may be employed as a general purpose GPU (GPGPU). A GPGPU may be a GPU that performs non-specialized calculations that would typically be conducted by a processor or central processing unit (CPU). The distributed computing may be with respect to Big Data, datacenters, and the like. The distributed computing may include Big Data analytics, high performance computing (HPC), cloud computing, web services, enterprise services, and so on.

A GPU generally is a computer chip that performs mathematical calculations, traditionally for rendering images. In the early days of computing, the CPU performed these calculations. As more graphics-intensive applications were developed, however, demands put strain on the CPU and degraded performance. The GPU came about as a way to offload those tasks from the CPU, freeing up the CPU processing power. A GPU may be able to render images more quickly than a CPU because of the GPU parallel processing architecture, which allows the GPU to perform multiple calculations at the same time. GPUs may be applicable chips for various tasks including resource-intensive tasks unrelated to graphics. Embodiments herein accommodate use of GPUs as general-purpose processors. In examples, GPU-accelerated computing may employ a GPU together with a CPU to support scientific, analytics, engineering, consumer, and enterprise applications.

A GPU cluster may be a computer cluster in which each node is equipped with a GPU. By harnessing the computational power of GPUs via general purpose computing or as a GPU accelerator, calculations can be performed with a GPU cluster. Again, general-purpose computing on GPUs (GPGPU) may use a GPU that handles computation for computer graphics, to perform computation in applications traditionally handled by the CPU. Moreover, multiple graphics cards in one computer, large numbers of graphics chips, GPUs on thousands of compute nodes, and so on, may further parallelize the already parallel nature of graphics processing. GPU accelerators may be utilized in datacenters in large enterprises, government labs, universities, and small-and-medium businesses, and so forth. GPU-accelerated computing offers application performance by offloading compute-intensive portions of the application to the GPU, including the option of any remainder of the code may run on the CPU. A CPU typically consists of a few cores optimized for sequential serial processing while a GPU typically has a parallel architecture consisting of thousands of smaller, more efficient cores designed for handling multiple tasks simultaneously. Indeed, GPUs may have thousands of cores to process parallel workloads efficiently.

Embodiments include a system and method for a distributed computing system having a compute node with a GPU to execute tasks of a distributed computing job. Again, the distributed computing system may have thousands of compute nodes. The distributed computing system may include a distributed-computing programming framework or language (e.g., employing a processing model) to execute the tasks on the compute node. The distributed computing system may have memory storing code executable by a processor to load a GPU-Daemon process that shares GPU resources between the tasks executing on the GPU of the compute node. The sharing of the GPU resources between tasks may reduce runtime overhead of the GPU and increase performance of the distributed computing system.

Embodiments may relate to techniques to reduce runtime overhead in using a GPU, including with Hadoop®, MapReduce, OpenCL™, and other programming frameworks. While the discussion herein may at times focus on Hadoop®, other programming frameworks such as MongoDB™ and others may be employed. Likewise, while the discussion may focus on MapReduce, other processing models or techniques, such as scattering and gathering of data between processing nodes, and so on, may be accommodated. Similarly, while the discussion may utilize OpenCL™ code and objects as an exemplary language, other open-source languages or proprietary languages may be implemented with embodiments. In general, distributed-computing programming frameworks may employ distributed-computing processing models and various programming languages.

Examples of distributed-computing programming frameworks include MongoDB™, Apache™ Hadoop®, Disco™, etc. Examples of distributed-computing processing models include MapReduce, Apache Spark™, Presto™, Bulk Synchronous Parallel (BSP), graph traversal, Apache Flink™, and so on. Indeed, again, various programming frameworks and programming languages may be employed in the programming and implementation of distributed computing systems. As discussed below, with respect to processing, the MapReduce or similar technique may be implemented with mapping and reducing functions.

Again, one example of a framework is Apache™ Hadoop® which is an Oracle® Java™-based programming framework that supports the processing of large data sets in a distributed computing environment. i.e., across clusters of computers or nodes. Hadoop® may be implemented in Linux®, Windows®, and other operating systems. Hadoop® and similar frameworks may employ "MapReduce" developed initially by Google™ but now genericized. MapReduce may be a framework or processing model for writing applications that process large amounts of structured and unstructured data in parallel across a cluster of thousands of machines or nodes, with considerations of reliability and fault-tolerance. For jobs, mapping the processing or calculations to multiple nodes in parallel is typically more efficient than performing the processing in a serial fashion on a single node. Some examples may employ processing techniques other than MapReduce.

Further, Hadoop® may employ the Hadoop® Distributed File System (HDFS) which is a Java™-based file system that provides a scalable distributed storage system. Alternative modules or programs may be employed. Moreover, the term "Hadoop" may refer to a variety of base modules as well as to an "ecosystem," or collection of additional software packages that can be installed on top of or alongside Hadoop®. Furthermore, while Java™ code is common with the Hadoop® MapReduce, any programming language can be generally used with Hadoop® to implement the "map" and "reduce" parts of a user's program, for example. Architecturally, Hadoop® may combine (1) HDFS that typically provides storage, and (2) the MapReduce programming model which may generally provide processing. Of course, other configurations and combinations are accommodated, including overall frameworks not including or involving Hadoop®. In general, embodiments may employ a distributed-computing programming framework that utilizes a programming model (e.g., MapReduce, graph traversal, message passing, etc.) for large-scale data processing.

As indicated, Hadoop®/MapReduce and similar frameworks facilitate distributed processing of large data sets across clusters of computers using relatively simple programming models and more complex programming models. As discussed, GPUs may be applicable for general-purpose computation due to the GPU performance for highly-parallel, throughput-oriented applications. An obstacle to effectively offloading computations to a GPU is the runtime overhead, such as GPU resources creation and destruction. These resources may include context, buffer, program and kernel, etc., such as in the context of OpenCL™. For general applications, the technologies to share or reuse these objects can reduce or eliminate the overhead. However, with Hadoop® and similar frameworks, MapReduce tasks (and similar model tasks) on the same physical node may run separately, such as running on separate Java™ Virtual Machines (JVMs) that cannot share state. In response, embodiments herein provide for reuse of GPU resources in a Hadoop® framework. Indeed, examples reuse GPU resources among MapReduce tasks and similar tasks running on the same physical node to reduce runtime overhead.

As indicated for particular examples, a system-wide daemon process, which may be labeled a GPU-Daemon Process, for instance, manages and reuses GPU resources. The GPU-Daemon process, within an application and general-purpose GPU (GPGPU) library, may work as a system services and start, for example, with system boot. In Hadoop®, because each task within one job generally performs the same or similar kind of work, many GPU resources can be shared, such as program, kernel and constant buffer, and the like. An exemplary GPU-Daemon process may detect the current task's requested GPU objects, and the process can reuse existing objects created with previous and existing tasks. Thus, GPU resources can be shared and reused by Hadoop® tasks scheduled on the same physical node. Therefore, GPGPU runtime overhead may be reduce and overall performance improved. In contrast, in plain Hadoop® framework, tasks of a job may run on separate JVMs which do not share state. In other words, to traditionally use the GPU, each task of a job generally creates its own GPU resources, though some of GPU resources are the same among the tasks. Thus, "redundant" runtime overhead results.

An exemplary implementation may be a GPU powered Kmeans implementation as an example in which each mapper calculates 8 million points' distance from 32 centerpoints and each point has 8 dimensions. Each task's GPU setup and cleanup (including Open CL context creation and build program in this example) cost 67 milliseconds (ms), while GPU execution time is 367 ms. If eight jobs are running on the same physical node, embodiments with a GPU-Daemon process may save about 8*67 ms which is approximately 15% of overall time in this example.

Figure 1:
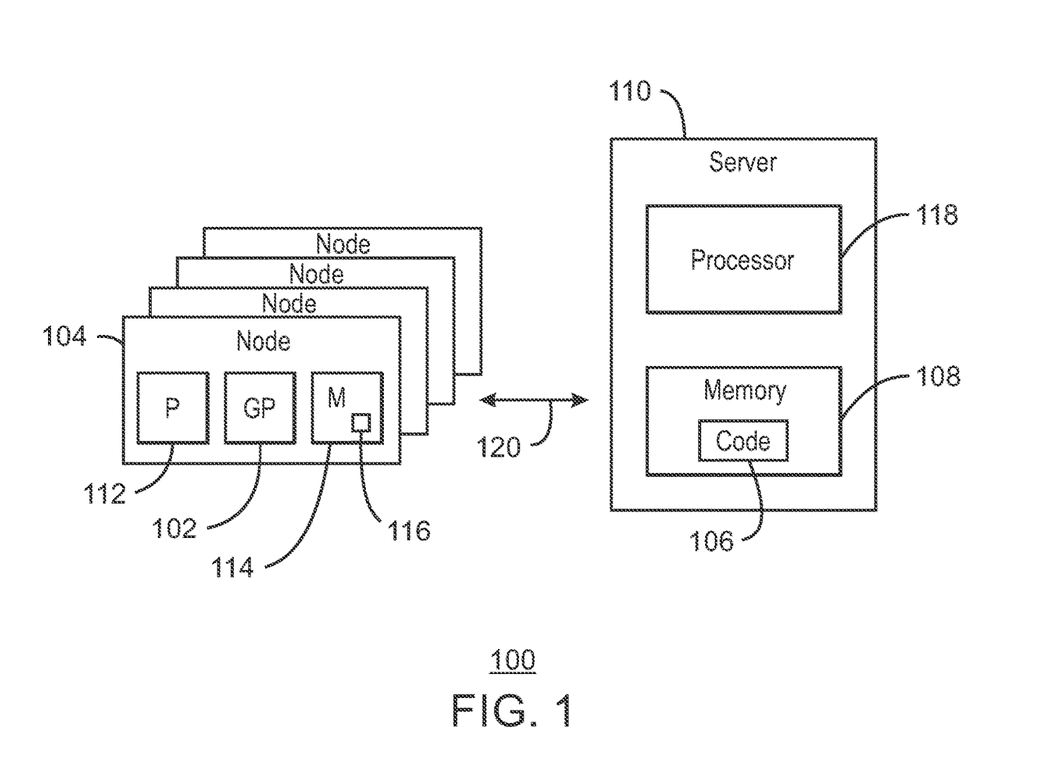
FIG. 1 is a diagram of a distributed computing system in accordance with embodiments of the present techniques.

FIG. 1 is a distributed computing system 100 having graphic processing units 102 (GPU) on respective nodes 104 (e.g., compute nodes). The number of nodes 104 may be 2, 8, 100, 1000, 10,000, 60,000, 200,000, and up to a million and greater. The system 100 includes executable code 106 (e.g., instructions, logic, etc.) stored in memory 108 of a server 110 facilitate execution of compute jobs and to implement techniques disclosed herein. The memory 108 may include non-volatile memory (hard drive, read-only-memory or ROM, flash memory, cards, etc.), volatile memory (e.g., random access memory or RAM, etc.), firmware, and other types of memory.

The distributed computing system 100 may be in a datacenter and/or disposed across multiple geographic locations. The nodes 104 may each have a GPU 102 and a processor 112 such as a hardware processor, a microprocessor, a central processing unit (CPU), and the like. The processor 112 may be multiple processors and/or each processor 102 may have multiple cores. Further, the nodes 104 may each have memory 114 storing code 116 executable by the processor 112 to facilitate execution of compute jobs and to implement techniques described herein. The memory 114 may include non-volatile memory (read-only-memory or ROM, flash memory, etc.), volatile memory (e.g., random access memory or RAM, etc.), firmware, and other types of memory.

The server 110 has one or more processors 118 (e.g., CPU). The server 110 is generally coupled with the compute nodes 104, as indicated by arrow 120. The server code 106 may be executable by the server processor 118 and by the node processors 112 to implement embodiments, such as in the loading of the GPU-daemon process. The system 100 may include multiple servers 110. Moreover, while FIG. 1 depicts a single server 110, the processor(s) 118 and memory 108 having the stored executable code 106 may instead or additionally be in other devices of the distributed computing system such as across the multiple compute nodes.

As indicated, MapReduce as a part of Hadoop® or similar framework may be a programming paradigm that facilitates scalability across hundreds or thousands of servers or nodes in a Hadoop® cluster. MapReduce may refer to at least two separate and distinct tasks that Hadoop® programs perform. The first is the map job, which takes a set of data and converts it into another set of data, where individual elements are broken down, for example, into tuples (key/value pairs). The reduce job takes the output from a map as input and combines those data tuples into a smaller set of tuples, for instance. As the sequence of the name MapReduce implies, the reduce job is generally performed after the map job.

In MapReduce, each worker node may execute one or more tasks (which can be Map or Reduce, or other actions). Map tasks may be assigned based on data locality, if possible. A map task may be assigned to the worker node where the data resides. Reduce tasks, which may be optional in certain examples, then typically aggregate the output of all of the dozens, hundreds, or thousands of map tasks, and produce final output. Moreover, the map may run a user-defined function. Further, in particular examples, Hadoop may parse the data in HDFS into user-defined keys and values, and each key and value may be then passed to mapper code.

As discussed, a GPU may be a programmable logic chip and may be located on plug-in cards, in a chipset on the motherboard or in the same chip as the central processing unit (CPU), or integrated with the processor or CPU on the CPU die, and the like. Modern GPUs are efficient at manipulating computer graphics and image processing, and their highly parallel structure makes them typically more effective than general-purpose CPUs for algorithms for parallel processing. A GPU may be a dedicated graphics cards, or an integrated graphics solution, and so on. The GPU, like the CPU, may be a single-chip processor.

As for programming, OpenCL™ may be used as example. However, embodiments can be applied on other GPGPU frameworks, such as NVida's CUDA and Intel's MDF (Media Development Framework), and the like. Open Computing Language (OpenCL™) is a framework for writing programs that execute across heterogeneous platforms consisting of central processing units (CPUs), graphics processing units (GPUs), digital signal processors (DSPs), field-programmable gate arrays (FPGAs) and other processors or hardware accelerators.

Figure 2:
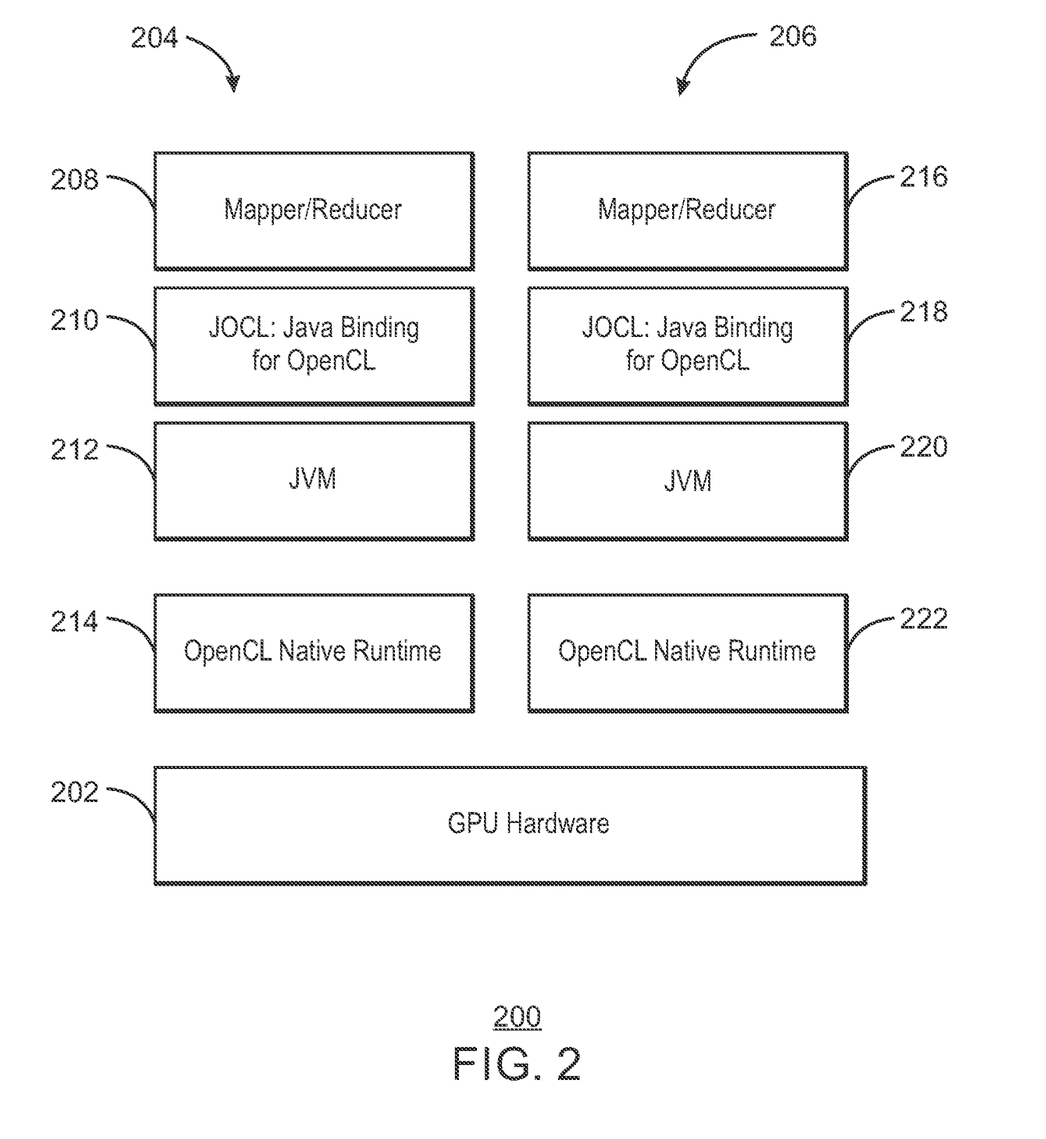
FIG. 2 is a diagrammatical representation of GPU system executing tasks.

FIG. 2 is a GPU system 200 having GPU hardware 202 executing two tasks 204 and 206. The tasks 204 and 206 may be executed at least partially in parallel. In this particular illustrated embodiment, the software or code associated with executing the first task 204 includes a mapper/reducer 208, a JOCL 210 (Java binding for OpenCL™), a JVM 212, and OpenCL™ Native Runtime 214. The software or code associated with executing the second task 206 includes a mapper/reducer 216, a JOCL 218, a JVM 220, and OpenCL Native Runtime 222.

FIG. 2 illustrates a traditional software stack of using OpenCL™ in Hadoop® or Hadoop® MapReduce framework. Because most of MapReduce applications may be written in Java, JOCL (an Open Sourced Java binding for OpenCL™) may be employed to talk with native library. MapReduce tasks scheduled on the same physical node run on separate JVMs and have to create independent GPU resources. In MapReduce, multiple tasks are scheduled on one node and the tasks may be performing the same or similar kind of work. Thus, many GPU resources, such as context, programs, and kernels, created by each task are the same. Due to conventional framework's limitation, those GPU resources generally cannot be shared, as discussed. Each task typically has to create its own objects, which may result in significant runtime overhead.

Conversely, to share GPU resources between MapReduce tasks on the same node, a GPU-Daemon Process is introduced between, for example, the JOCL and OpenCL™ native library. Calls from JOCL may go through GPU-Daemon Process, instead of native library, for instance. When GPU-Daemon Process receives a request from an application, the GPU-Daemon Process may search and find any cached resource (e.g., object) that is reusable. If a cached resource is found, the GPU-Daemon Process may return the existing resource back without creating a new one. The GPU-Daemon Process may be started with an operating system (OS) boot and run as a system service, such as in the background, and thus can be called by tasks on the same node.

Figure 3:
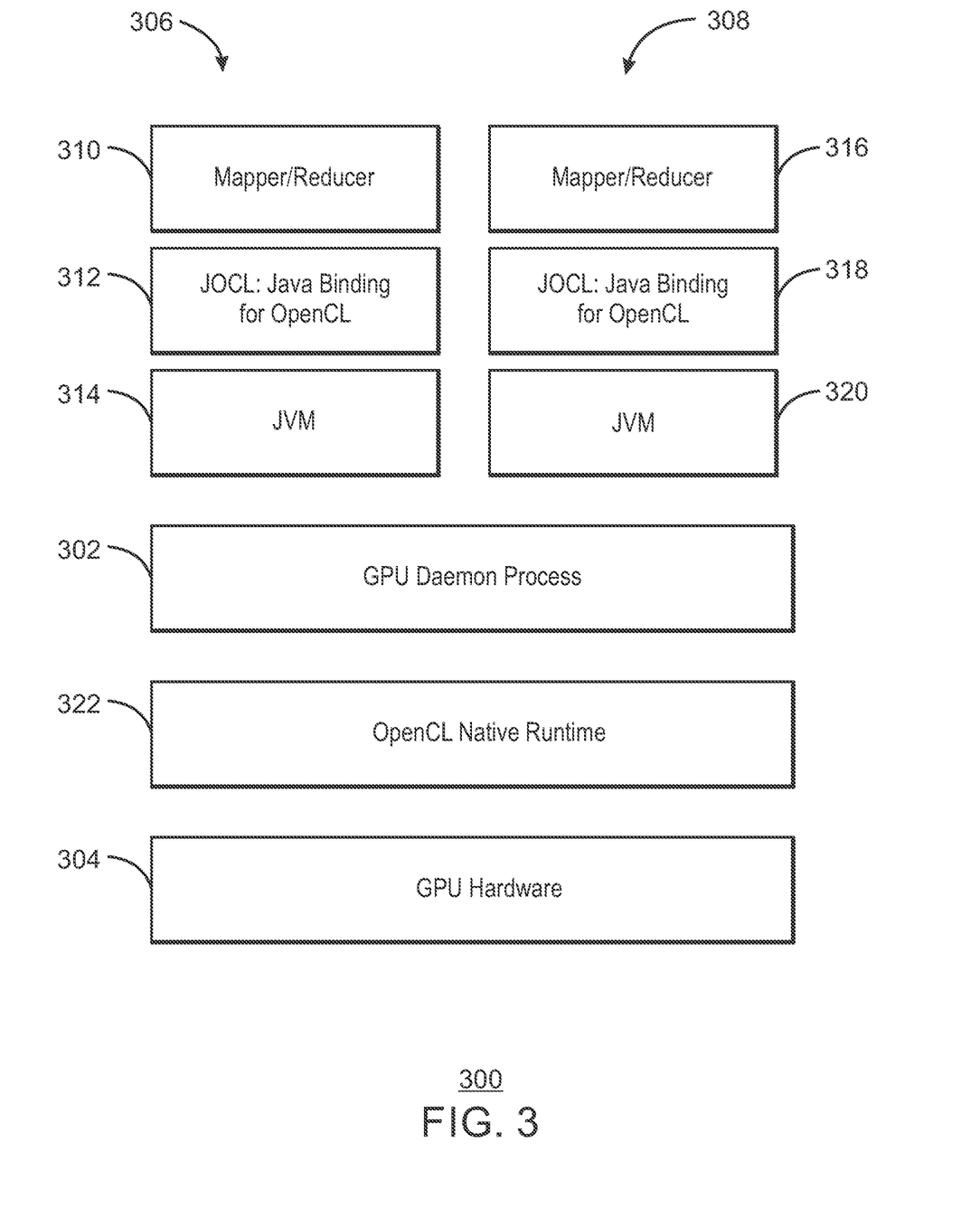
FIG. 3 is a diagrammatical representation of GPU system executing tasks in accordance with embodiments of the present techniques.
Figure 4:
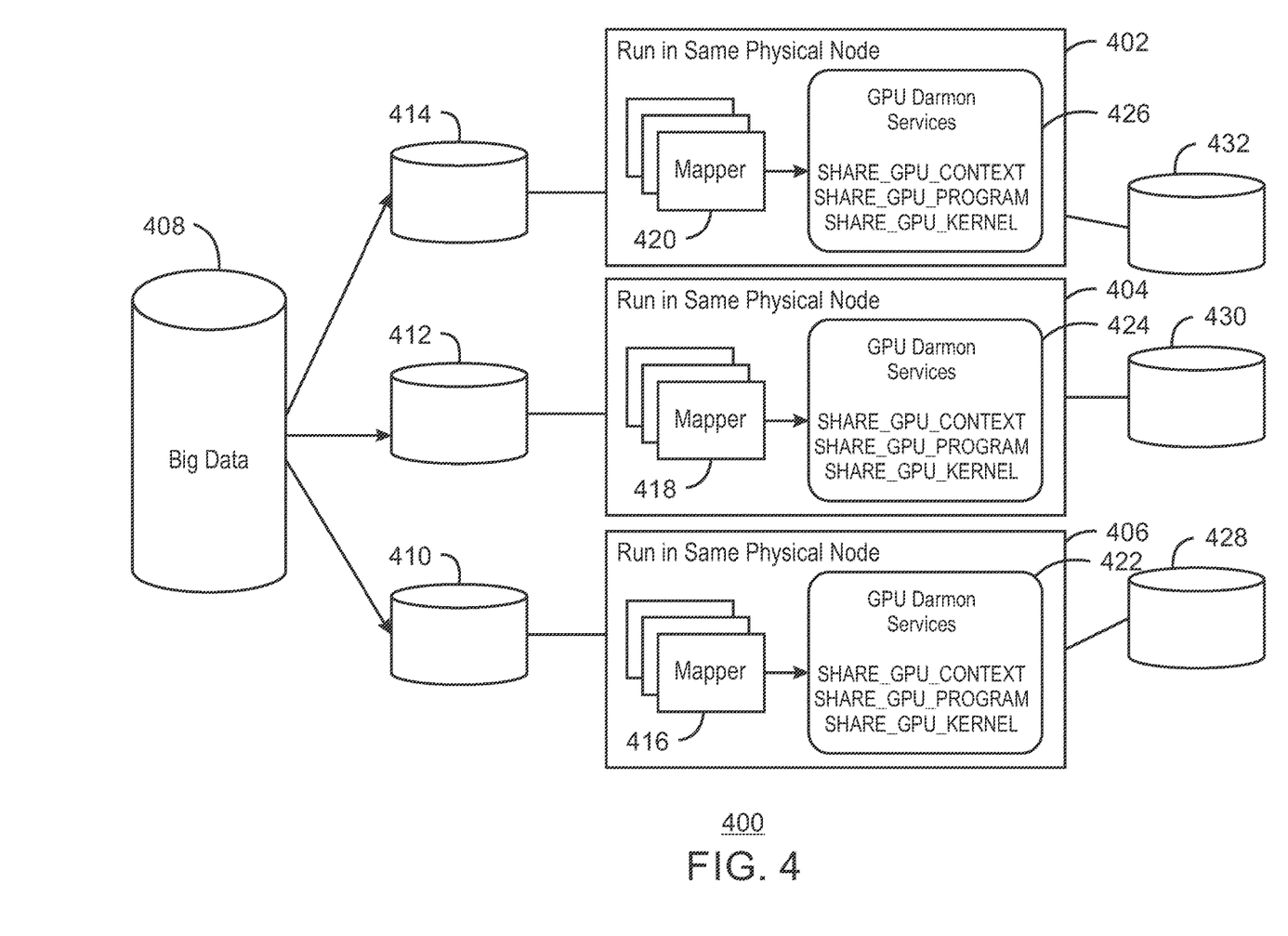
FIG. 4 is a diagram of a distributed computing system in accordance with embodiments of the present techniques.

FIG. 3 and FIG. 4 show the system diagram and overview structure of the GPU-Daemon Process. In particular, FIG. 3 is a diagrammatical representation 300 depicting a GPU daemon process 302 interacting with GPU hardware 304 executing two tasks 306 and 308. In the illustrated embodiment, software or code associated with executing the first task 306 includes a mapper/reducer 310, a JOCL 312, and a JVM 314. Software or code associated with executing the second task 308 includes a mapper/reducer 316, a JOCL 318, and a JVM 320. The GPU-Daemon process 302 facilitates joint operation (shared) of the OpenCL™ Native Runtime 322 for the tasks 306 and 308. Of course, the GPU-Daemon process 302 may facilitate the sharing of additional objects and resources between tasks executing on the GPU.

FIG. 4 may be used to provide an overview of a GPU-Daemon process. FIG. 4 is a distributed computing system 400 having physical nodes 402, 404, 406 processing Big Data 408 via respective feed storage 410, 412, 414. Each node 402, 404, 406 executes multiple mapper tasks, as indicated by reference numerals 416, 418, 420, on respective GPUs 417, 419, 421. A respective GPU daemon process 422, 422, 426 having services facilitates sharing between tasks on a given physical node GPU. The text denoting services is exemplary. The output of the nodes 402, 404, 406 may be placed in storage 428, 430, 432. Lastly, while the number of physical nodes depicted is three, it will be understood that the number of physical nodes may be in the thousands, for example.

Figure 5:
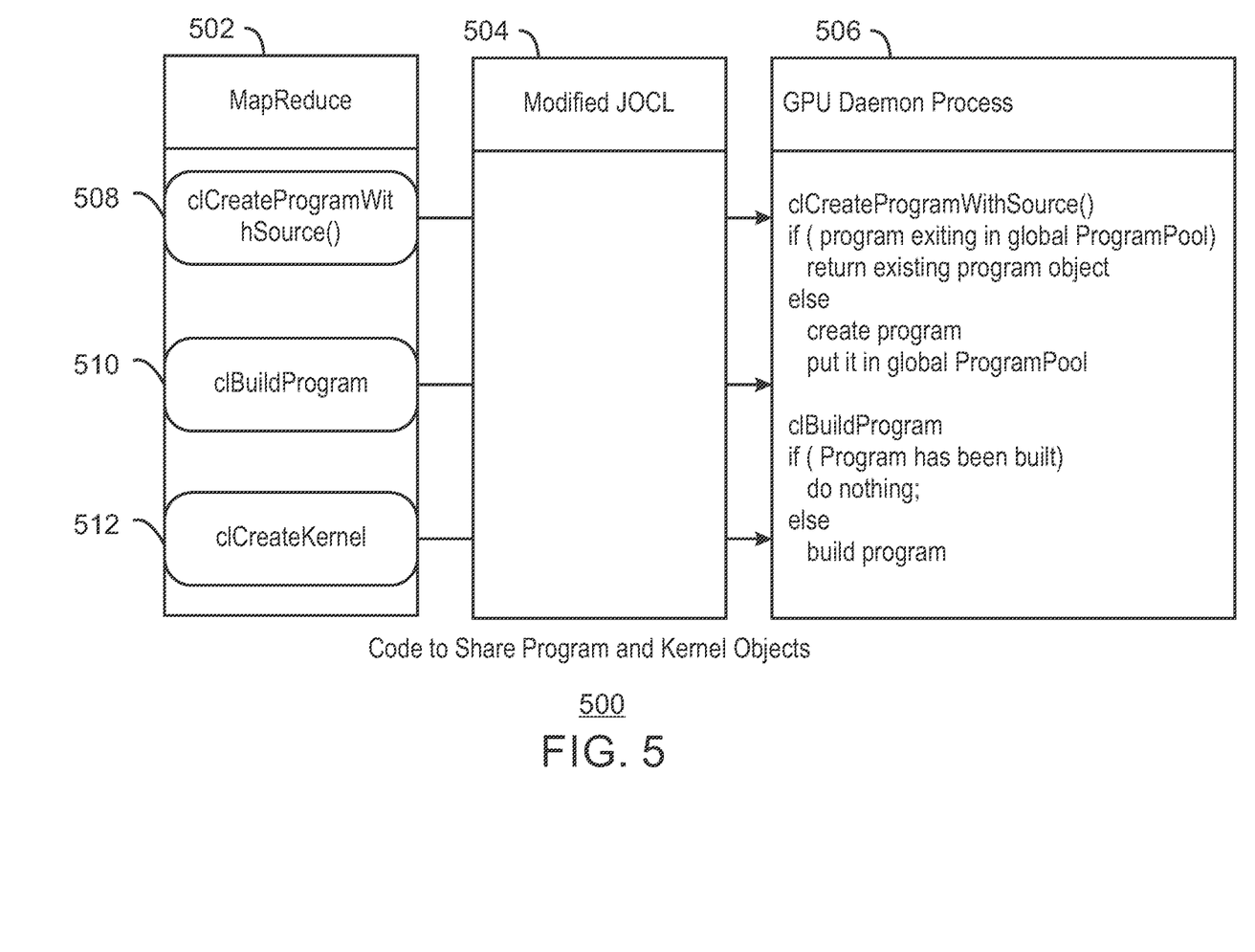
FIG. 5 is a diagrammatical representation of code to share objects in accordance with embodiments of the present techniques.

FIG. 5 is a diagrammatical representation 500 of code to share program and kernel objects on a GPU on a physical node of a distributed computing system. Such code may be for sharing and/or reusing program and kernel objects via GPU-Daemon Process. A MapReduce 502 function and a modified JOCL 504 function are impacted by a GPU daemon process 506. The MapReduce 502 may include operations of clCreateProgramWithSource( ) 508, clBuildProgram 510, clCreateKernel 512, and the like. The GPU daemon process 506 may include the exemplary depicted code and other code. The code, instructions, logic mentioned with respect to FIGS. 2-5 may be, for example the code 106 executing on the GPU and processor in FIG. 1.

Figure 6:
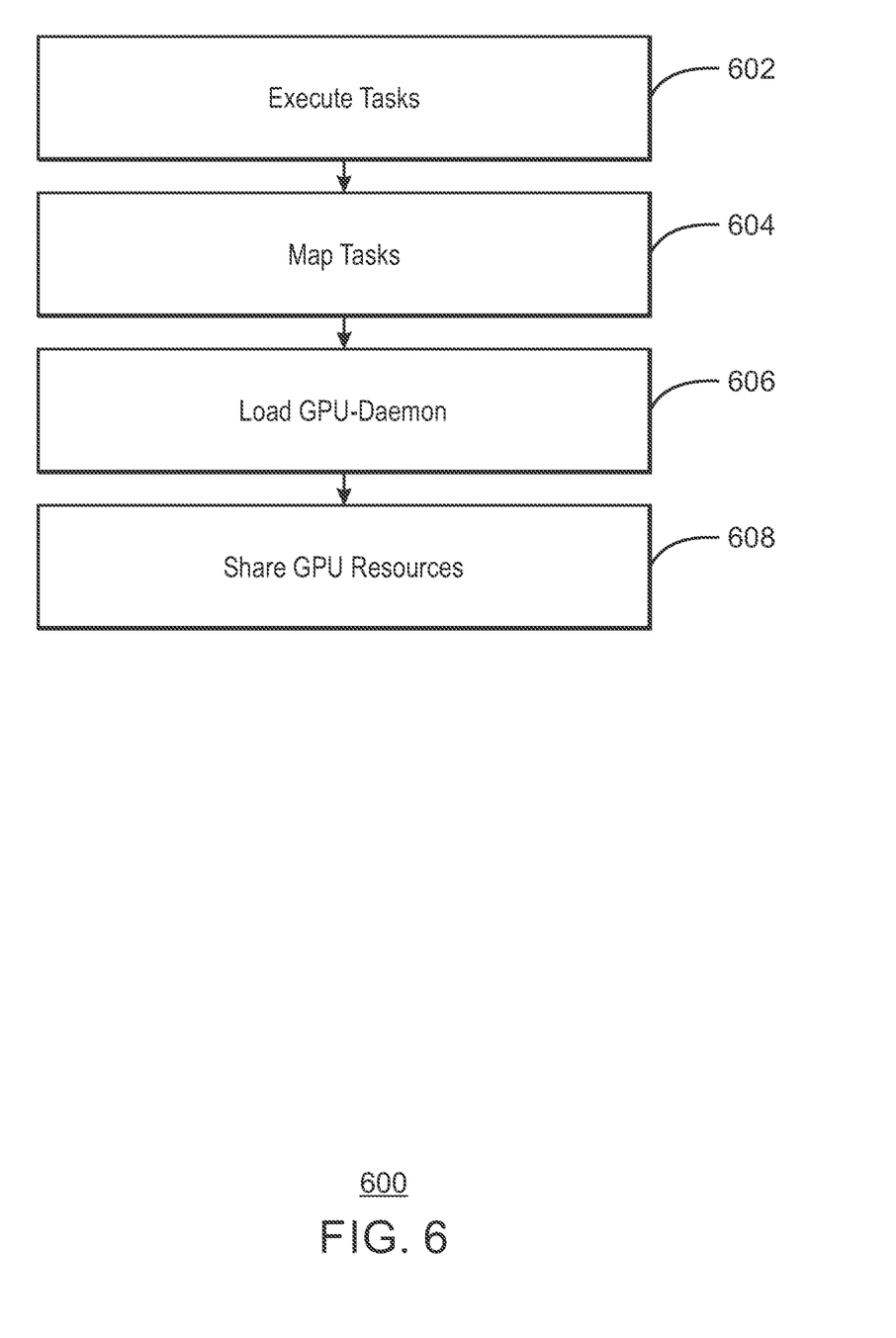
FIG. 6 is a block flow diagram of method of distributed computing in accordance with embodiments of the present techniques.

FIG. 6 is a method 600 of distributed computing. At block 602, the method includes executing tasks of a distributed computing job via a distributed-computing programming framework (e.g., having MapReduce) on a graphics processing unit (GPU) of a compute node of a distributed computing system. At block 604, the method includes mapping, via the distributed-computing programming framework, at least some of the tasks to the compute node. At block 606, the method includes loading, via a processor, a GPU-daemon process that runs in a background of the distributed-computing programming framework. At block 608, the GPU-daemon process facilitates the distributed-computing programming framework to share GPU resources between the tasks executing on the GPU. The GPU resources may be objects of the distributed-computing programming framework. The compute node may include a processor or CPU in addition to the GPU, and wherein the distributed computing system has multiple compute nodes.

MapReduce libraries have been written in many programming languages, with different levels of optimization. An open-source implementation that has support for distributed shuffles may be part of Hadoop®. Two functions of MapReduce are parceling out work to various nodes within the cluster or map, and then organizing and reducing the results from each node into a cohesive answer to a query, for example. The Hadoop® and/or MapReduce may involve JobTracker (e.g., a master node managing jobs and resources in a cluster), TaskTrackers (e.g., agents deployed to each machine or node in the cluster to run the map and reduce tasks), JobHistoryServer (e.g., a component that tracks completed jobs, and is typically deployed as a separate function or with JobTracker), and so on.

To distribute input data and collate results, MapReduce generally operates in parallel across massive cluster sizes. MapReduce is available in several languages, including C, C++, Java, Ruby, Perl and Python. Programmers can use MapReduce libraries to create tasks including in certain examples without dealing with communication or coordination between nodes. Using the MapReduce model, Hadoop can take a query over a dataset, divide the query, and the query in parallel over multiple nodes. Distributing the computation may solve the problem of having data too large to fit onto a single machine.

The aforementioned Hadoop® Distributed File System (HDFS) may break up input data and store data on compute nodes, and thus facilitate data to be processed in parallel using machines or nodes in the cluster. HDFS may be written in Java and may run on different operating systems. Indeed, an objective of MapReduce may be to split the input data set into independent portions processed in parallel. The Hadoop® MapReduce framework may sort outputs of the maps, which are then input to the reduce tasks. Typically, both the input and the output of the job may be stored in a file system.

Figure 7:
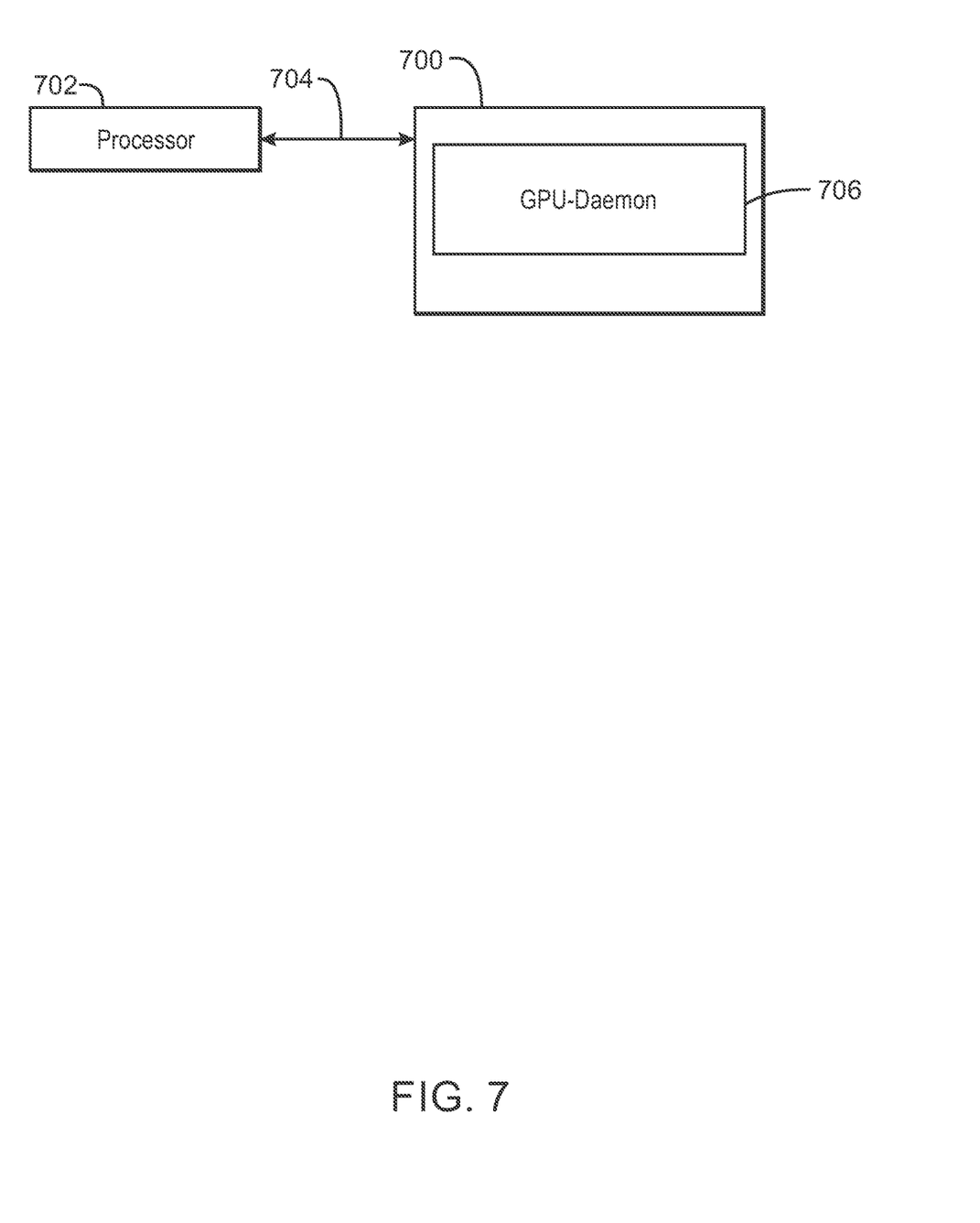
FIG. 7 is a block diagram depicting a tangible non-transitory, computer-readable medium that can facilitate distributed computing in accordance with embodiments of the present techniques.

FIG. 7 is a block diagram depicting an example of a tangible non-transitory, computer-readable medium 700 that can facilitate distributed computing. The computer-readable medium 700 may be accessed by a processor 702 over a computer interconnect 704. The tangible, non-transitory, computer-readable medium 700 may include executable instructions or code to direct the processor 702 to perform the operations of the techniques described herein.

The various software components discussed herein may be stored on the tangible, non-transitory, computer-readable medium 700, as indicated in FIG. 7. For example, a GPU-Daemon process module 706 (executable code/instructions) may direct the processor 702 to load and run the GPU-Daemon process. The GPU-Daemon process may facilitate sharing of GPU resources of tasks executing on a GPU of a single physical node of a distributed computing system.

Big Data may be an evolving term that describes a voluminous amount of structured, semi-structured and unstructured data that has the potential to be mined for information. MapReduce may be a programming model and an associated implementation for processing and generating large data sets with a parallel, distributed algorithm on a cluster. Similar approaches may include, for instance, the Message Passing Interface standard having reduce and scatter operations. A MapReduce program may be composed of a Map( ) procedure (method) that performs filtering and sorting (such as sorting students by first name into queues, one queue for each name) and a Reduce( ) method that performs a summary operation (such as counting the number of students in each queue, yielding name frequencies). The "MapReduce System" (also called "infrastructure" or "framework") orchestrates the processing by marshalling the distributed servers or nodes, running the various tasks in parallel, managing communications and data transfers between various parts of the system, and providing for redundancy and fault tolerance. Indeed, aspects of the MapReduce framework may be map and reduce functions, but also scalability and fault-tolerance for a variety of applications. MapReduce may be a framework for processing parallelizable problems across large datasets using a large number of computers (nodes), collectively referred to as a cluster (e.g., for nodes on a network) or a grid (e.g., for nodes across geographically and administratively distributed systems). Similar or heterogeneous hardware may be involved. Processing may occur, for example, on data stored either in a filesystem (unstructured) or in a database (structured). MapReduce can take advantage of locality of data, processing it on or near the storage assets in order to reduce the distance over which data is transmitted. The actions or steps may include map, shuffle, reduce, and so on.

In summary, an embodiment may include a distributed computing system having a compute node. Indeed, a distributed computing system may have thousands of compute nodes. The compute node includes a GPU to execute tasks of a distributed computing job. A distributed-computing programming framework (e.g., relying an open-source programming language or OpenCL™) executes the tasks on the compute node. The framework may employ Hadoop® and MapReduce, for example. The tasks may be mapped to the compute node by the distributed-computing programming framework. The compute node may have a processor or CPU in addition to the GPU.

Memory storing code executable by a processor loads a GPU-daemon process that shares GPU resources (e.g., objects of the open-source programming language such as context, buffer, program, and kernel) between the tasks executing on the GPU of the compute node. Memory on the computer node and/or a server of the distributed computing system may store the code. The GPU-daemon process may be loaded at start of an operating system and runs in a background of the distributed-computing programming framework, and wherein sharing GPU resources between tasks reduces runtime overhead of the GPU.

For discussion, consider two tasks executing on the GPU including a first task and a second task, the first task to request a first GPU resource and, therefore, the distributed-computing programming framework to create the first GPU resource for the first task. The second task requests the first GPU resource, and the GPU-daemon process detects the request by the second task and facilitates the distributed-computing programming framework to reuse the first GPU resource for the second task.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are given. Example 1 is a distributed computing system. The distributed computing system includes: a compute node comprising a graphics processing unit (GPU) to execute tasks of a distributed computing job; a distributed-computing programming framework to execute the tasks on the compute node; and memory storing code executable by a processor to load a GPU-daemon process that shares GPU resources between the tasks executing on the GPU of the compute node.

Example 2 includes the distributed computing system of example 1, including or excluding optional features. In this example, the GPU-daemon process is loaded at start of an operating system and runs in a background of the distributed-computing programming framework, and wherein sharing GPU resources between the tasks reduces runtime overhead of the GPU.

Example 3 includes the distributed computing system of any one of examples 1 to 2, including or excluding optional features. In this example: the tasks that execute on the GPU comprise a first task and a second task; the first task to request a first GPU resource; the distributed-computing programming framework to create the first GPU resource for the first task; the second task to request the first GPU resource; and the GPU-daemon process to detect the request by the second task and to facilitate the distributed-computing programming framework to reuse the first GPU resource for the second task.

Example 4 includes the distributed computing system of any one of examples 1 to 3, including or excluding optional features. In this example, the distributed-computing programming framework comprises an open-source programming language, and wherein the GPU resources comprise objects of the open-source programming language.

Example 5 includes the distributed computing system of any one of examples 1 to 4, including or excluding optional features. In this example, the distributed-computing programming framework comprises OpenCL™, and wherein the GPU resources shared comprise objects comprising context, buffer, program, and kernel.

Example 6 includes the distributed computing system of any one of examples 1 to 5, including or excluding optional features. In this example, the tasks are mapped to the compute node by the distributed-computing programming framework.

Example 7 includes the distributed computing system of any one of examples 1 to 6, including or excluding optional features. In this example, the distributed-computing programming framework employs MapReduce.

Example 8 includes the distributed computing system of any one of examples 1 to 7, including or excluding optional features. In this example, the distributed-computing programming framework comprises Hadoop®.

Example 9 includes the distributed computing system of any one of examples 1 to 8, including or excluding optional features. In this example, the compute node comprises a processor in addition to the GPU, and wherein the distributed computing system comprises multiple compute nodes.

Example 10 includes the distributed computing system of any one of examples 1 to 9, including or excluding optional features. In this example, the compute node comprises the memory storing the code.

Example 11 includes the distributed computing system of any one of examples 1 to 10, including or excluding optional features. In this example, a server of the distributed computing system comprises the memory storing the code.

Example 12 is a non-transitory, computer-readable medium comprising instructions, when executed by a processor, direct the processor to load a graphics processing unit (GPU)-daemon process that shares GPU resources among job tasks executing on a GPU of a compute node of a distributed computing system. The job tasks are executed on the GPU of the compute node via a distributed-computing programming framework Example 13 includes the computer-readable medium of example 12, including or excluding optional features. In this example, the GPU-daemon process is loaded at start of an operating system and runs in a background of an application, and wherein sharing GPU resources between the job tasks reduces runtime overhead of the GPU.

Example 14 includes the computer-readable medium of any one of examples 12 to 13, including or excluding optional features. In this example, the distributed-computing programming framework maps the job tasks to the compute node.

Example 15 includes the computer-readable medium of any one of examples 12 to 14, including or excluding optional features. In this example, the distributed-computing programming framework employs MapReduce.

Example 16 includes the computer-readable medium of any one of examples 12 to 15, including or excluding optional features. In this example, the distributed-computing programming framework comprises Hadoop®.

Example 17 includes the computer-readable medium of any one of examples 12 to 16, including or excluding optional features. In this example, the compute node comprises a processor in addition to the GPU.

Example 18 includes the computer-readable medium of any one of examples 12 to 17, including or excluding optional features. In this example, the distributed computing system comprises multiple compute nodes.

Example 19 includes the computer-readable medium of any one of examples 12 to 18, including or excluding optional features. In this example, the GPU resources comprise objects of the distributed-computing programming framework.

Example 20 is a method of distributed computing. The method includes: executing tasks of a distributed computing job via a distributed-computing programming framework on a graphics processing unit (GPU) of a compute node of a distributed computing system; and loading, via a processor, a GPU-daemon process that runs in a background of the distributed-computing programming framework and that facilitates the distributed-computing programming framework to share GPU resources between the tasks executing on the GPU.

Example 21 includes the method of example 20, including or excluding optional features. In this example, the method includes: creating, via the distributed-computing programming framework, a first resource in response to a request for the first resource by a first task, wherein the tasks comprise the first task and a second task, and wherein the GPU resources comprise the first resource; detecting, via the GPU-daemon process, a request for the first resource by the second task; and reusing, via the GPU-daemon process, the first resource for the second task in response to detecting the request by the second task, and not recreating the first resource for the second task.

Example 22 includes the method of any one of examples 20 to 21, including or excluding optional features. In this example, the GPU resources comprise objects of the distributed-computing programming framework.

Example 23 includes the method of any one of examples 20 to 22, including or excluding optional features. In this example, the method includes mapping, via the distributed-computing programming framework, at least some of the tasks to the compute node.

Example 24 includes the method of any one of examples 20 to 23, including or excluding optional features. In this example, the distributed-computing programming framework comprises MapReduce.

Example 25 includes the method of any one of examples 20 to 24, including or excluding optional features. In this example, the compute node comprises a processor in addition to the GPU, and wherein the distributed computing system comprises multiple compute nodes.

Example 26 is a distributed computing system. The distributed computing system includes: a compute node comprising a graphics processing unit (GPU) to execute tasks of a distributed computing job; a distributed-computing programming framework to execute the tasks on the compute node; and a GPU-daemon process that shares GPU resources between the tasks executing on the GPU of the compute node.

Example 27 includes the distributed computing system of example 26, including or excluding optional features. In this example, the distributed computing system includes memory storing code executable by a processor to load the GPU-daemon process at start of an operating system, wherein the background comprises a background of the distributed-computing programming framework, and wherein sharing GPU resources between the tasks reduces runtime overhead of the GPU.

Example 28 includes the distributed computing system of any one of examples 26 to 27, including or excluding optional features. In this example, the tasks are mapped to the compute node by the distributed-computing programming framework, wherein the compute node comprises a processor in addition to the GPU, and wherein the distributed computing system comprises multiple compute nodes.

Example 29 includes the distributed computing system of any one of examples 26 to 28, including or excluding optional features. In this example, the distributed-computing programming framework comprises an open-source programming language, and wherein the GPU resources comprise objects of the open-source programming language. Optionally, the distributed-computing programming framework comprises MapReduce and OpenCL™, and wherein the GPU resources shared comprise objects comprising context, buffer, program, and kernel.

Example 30 includes the distributed computing system of any one of examples 26 to 29, including or excluding optional features. In this example, the tasks that execute on the GPU comprise a first task and a second task; the first task to request a first GPU resource; the distributed-computing programming framework to create the first GPU resource for the first task; the second task to request the first GPU resource; and the GPU-daemon process to detect the request by the second task and to facilitate the distributed-computing programming framework to reuse the first GPU resource for the second task.

Example 31 is a non-transitory, computer-readable medium comprising instructions executable by a processor of a computing device to load a graphics processing unit (GPU)-daemon process that shares GPU resources among job tasks executing on a GPU of a compute node of a distributed computing system. The job tasks are executed on the GPU of the compute node via a distributed-computing programming framework.

Example 32 includes the computer-readable medium of example 31, including or excluding optional features. In this example, the GPU-daemon process is loaded at start of an operating system and runs in a background of an application, wherein sharing GPU resources between tasks reduces runtime overhead of the GPU, and wherein the distributed-computing programming framework maps the job tasks to the compute node.

Example 33 includes the computer-readable medium of any one of examples 31 to 32, including or excluding optional features. In this example, the GPU resources comprise objects of the distributed-computing programming framework.

Example 34 includes the computer-readable medium of any one of examples 31 to 33, including or excluding optional features. In this example, the distributed-computing programming framework comprises Hadoop® and employs MapReduce.

Example 35 is a method of distributed computing. The method includes: executing tasks of a distributed computing job via a distributed-computing programming framework on a graphics processing unit (GPU) of a compute node of a distributed computing system; and loading, via a processor, a GPU-daemon process that runs in a background of the distributed-computing programming framework and that facilitates the distributed-computing programming framework to share GPU resources between the tasks executing on the GPU.

Example 36 includes the method of example 35, including or excluding optional features. In this example, the GPU resources comprise objects of the distributed-computing programming framework.

Example 37 includes the method of any one of examples 35 to 36, including or excluding optional features. In this example, the method includes mapping, via the distributed-computing programming framework, at least some of the tasks to the compute node, wherein the compute node comprises a processor in addition to the GPU, and wherein the distributed computing system comprises multiple compute nodes.

Example 38 includes the method of any one of examples 35 to 37, including or excluding optional features. In this example, the distributed-computing programming framework comprises MapReduce.

Example 39 includes the method of any one of examples 35 to 38, including or excluding optional features. In this example, the method includes: creating, via the distributed-computing programming framework, a first resource in response to a request for the first resource by a first task, wherein the tasks comprise the first task and a second task, and wherein the GPU resources comprise the first resource; detecting, via the GPU-daemon process, a request for the first resource by the second task; and reusing, via the GPU-daemon process, the first resource for the second task in response to detecting the request by the second task, and not recreating the first resource for the second task.

Example 40 is a distributed computing system. The distributed computing system includes: a compute node comprising a graphics processing unit (GPU) to execute tasks of a distributed computing job; a distributed-computing programming framework to execute the tasks on the compute node; and a GPU-daemon process to share GPU resources between the tasks executing on the GPU of the compute node, wherein the GPU-daemon process to run in a background of the distributed-computing programming framework, and wherein to share the GPU resources between the tasks reduces runtime overhead of the GPU.

Example 41 includes the distributed computing system of example 40, including or excluding optional features. In this example, the GPU-daemon process is loaded at start of an operating system of the distributed computing system, wherein the distributed-computing programming framework comprises an open-source programming language, and wherein the GPU resources comprise objects of the open-source programming language.

Example 42 includes the distributed computing system of any one of examples 40 to 41, including or excluding optional features. In this example, the tasks are mapped to the compute node by the distributed-computing programming framework.

Example 43 includes the distributed computing system of any one of examples 40 to 42, including or excluding optional features. In this example, the distributed-computing programming framework employs MapReduce.

Example 44 includes the distributed computing system of any one of examples 40 to 43, including or excluding optional features. In this example, the distributed-computing programming framework comprises Hadoop®.

Example 45 includes the distributed computing system of any one of examples 40 to 44, including or excluding optional features. In this example, the compute node comprises a processor in addition to the GPU, and wherein the distributed computing system comprises multiple compute nodes.

Example 46 includes the distributed computing system of any one of examples 40 to 45, including or excluding optional features. In this example, the GPU-daemon process comprises executable code store in memory on a server of the distributed computing system or in memory on the compute node, or both.

Example 47 is a method of distributed computing. The method includes: executing tasks of a distributed computing job via a distributed-computing programming framework on a graphics processing unit (GPU) of a compute node of a distributed computing system; and loading a process that shares GPU resources between the tasks executing on the GPU.

Example 48 includes the method of example 47, including or excluding optional features. In this example, the process runs in a background of the distributed-computing programming framework.

Example 49 includes the method of any one of examples 47 to 48, including or excluding optional features. In this example, the process runs in a background of an operating system or application of the distributed computing system.

Example 50 includes the method of any one of examples 47 to 49, including or excluding optional features. In this example, the GPU resources comprise objects of the distributed-computing programming framework.

Example 51 includes the method of any one of examples 47 to 50, including or excluding optional features. In this example, the method includes mapping the tasks to the compute node, wherein the compute node comprises a processor in addition to the GPU, and wherein the distributed computing system comprises multiple compute nodes.

Example 52 includes the method of any one of examples 47 to 51, including or excluding optional features. In this example, the method includes executing the tasks in accordance with MapReduce.

Example 53 includes the method of any one of examples 47 to 51, including or excluding optional features. In this example, the distributed-computing programming framework comprises Hadoop®.

Example 54 is a non-transitory, computer-readable medium comprising instructions, when executed by a hardware processor, direct the processor to load a background process that shares graphic processing unit (GPU) resources between tasks executing on a GPU of a compute node of a distributed computing system. The distributed computing job is executed via a distributed-computing programming framework on multiple compute nodes of the distributed computing system.

Example 55 includes the computer-readable medium of example 54, including or excluding optional features. In this example, the background process runs in a background of the distributed-computing programming framework.

Example 56 includes the computer-readable medium of any one of examples 54 to 55, including or excluding optional features. In this example, the background process runs in a background of an operating system or application of the distributed computing system.

Example 57 includes the computer-readable medium of any one of examples 54 to 56, including or excluding optional features. In this example, the GPU resources comprise objects of the distributed-computing programming framework.

Example 58 includes the computer-readable medium of any one of examples 54 to 57, including or excluding optional features. In this example, the tasks are mapped to the compute node, and wherein the compute node comprises a processor in addition to the GPU.

Example 59 includes the computer-readable medium of any one of examples 54 to 58, including or excluding optional features. In this example, the distributed computing job is executed in accordance with MapReduce.

Example 60 includes the computer-readable medium of any one of examples 54 to 59, including or excluding optional features. In this example, the distributed-computing programming framework comprises Hadoop®.

Example 61 is a distributed computing system. The distributed computing system includes: means for executing tasks of a distributed computing job on multiple compute nodes having a graphics processing unit (GPU); and means for sharing GPU resources between tasks of the distributed computing job executing on a GPU of a compute node of the multiple compute nodes.

Example 62 includes the distributed computing system of example 61, including or excluding optional features. In this example, the means for sharing comprises means for loading a background process to facilitate sharing of the GPU resources between the tasks executing on the GPU.

Example 63 includes the computing system of any one of examples 61 to 62, including or excluding optional features. In this example, the GPU resources comprise virtual objects of the means for executing tasks.

Example 64 includes the computing system of any one of examples 61 to 63, including or excluding optional features. In this example, the means for executing tasks comprise means for mapping the tasks to the compute node, wherein the compute node comprises a processor in addition to the GPU, and wherein the distributed computing system comprises the multiple compute nodes.

Example 65 includes the computing system of any one of examples 61 to 64, including or excluding optional features. In this example, the means for executing tasks comprises means for executing the tasks in accordance with MapReduce.

Example 66 includes the computing system of any one of examples 61 to 65, including or excluding optional features. In this example, the means for executing tasks comprises means for creating a first resource in response to a request for the first resource by a first task, wherein the GPU resources comprise the first resource, and wherein the tasks comprise the first task and a second task.

Example 67 includes the computing system of any one of example 66, including or excluding optional features. In this example, the means for sharing GPU resources comprises: means for detecting a request for the first resource by the second task; and means for supplying the first resource for the second task in response to detecting the request by the second task, wherein the first resource is not recreated for the second task.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A distributed computing system comprising:
   a compute node comprising a graphics processing unit (GPU) to execute tasks of a distributed computing job;
   a distributed-computing programming framework to execute the tasks on the compute node; and
   memory storing code executable by a processor to load a GPU-daemon process that intercepts calls from tasks executing on the GPU to create a GPU resource, and shares previously-created GPU resources between the tasks executing on the GPU of the compute node when the call to create the GPU resource is redundant.

2. The distributed computing system of claim 1, wherein the GPU-daemon process is loaded at start of an operating system and runs in a background of the distributed-computing programming framework, and wherein sharing GPU resources between the tasks reduces runtime overhead of the GPU.

3. The distributed computing system of claim 1, wherein:
the tasks that execute on the GPU comprise a first task and a second task;
the first task to request a first GPU resource;
the distributed-computing programming framework to create the first GPU resource for the first task;
the second task to request the first GPU resource; and
the GPU-daemon process to detect the request by the second task and to facilitate the distributed-computing programming framework to reuse the first GPU resource for the second task.

4. The distributed computing system of claim 1, wherein the distributed-computing programming framework comprises an open-source programming language, and wherein the GPU resources comprise objects of the open-source programming language.

5. The distributed computing system of claim 1, wherein the distributed-computing programming framework comprises OpenCL™, and wherein the GPU resources shared comprise objects comprising context, buffer, program, and kernel.

6. The distributed computing system of claim 1, wherein the tasks are mapped to the compute node by the distributed-computing programming framework.

7. The distributed computing system of claim 1, wherein the distributed-computing programming framework employs MapReduce.

8. The distributed computing system of claim 1, wherein the distributed-computing programming framework comprises Hadoop®.

9. The distributed computing system of claim 1, wherein the compute node comprises a processor in addition to the CPU, and wherein the distributed computing system comprises multiple compute nodes.

10. The distributed computing system of claim 1, wherein the compute node comprises the memory storing the code.

11. The distributed computing system of claim 1, wherein a server of the distributed computing system comprises the memory storing the code.

12. A non-transitory, computer-readable medium comprising instructions executable by a processor of a computing device to load a graphics processing unit (GPU)-daemon process that intercepts calls from tasks executing on the CPU to create a CPU resource, and shares GPU resources among job tasks executing on a CPU of a compute node of a distributed computing system when the call to create the CPU resource is redundant, wherein the job tasks are executed on the CPU of the compute node via a distributed-computing programming framework.

13. The non-transitory, computer-readable medium of claim 12, wherein the GPU-daemon process is loaded at start of an operating system and runs in a background of an application, and wherein sharing GPU resources between the job tasks reduces runtime overhead of the GPU.

14. The non-transitory, computer-readable medium of claim 12, wherein the distributed-computing programming framework maps the job tasks to the compute node.

15. The non-transitory, computer-readable medium of claim 12, wherein the distributed-computing programming framework employs Map Reduce.

16. The non-transitory, computer-readable medium of claim 12, wherein the distributed-computing programming framework comprises Hadoop®.

17. The non-transitory, computer-readable medium of claim 12, wherein the compute node comprises a processor in addition to the GPU.

18. The non-transitory, computer-readable medium of claim 12, wherein the distributed computing system comprises multiple compute nodes.

19. The non-transitory, computer-readable medium of claim 12, wherein the GPU resources comprise objects of the distributed-computing programming framework.

20. A method of distributed computing, comprising:
executing tasks of a distributed computing job via a distributed-computing programming framework on a graphics processing unit (GPU) of a compute node of a distributed computing system; and
loading, via a processor, a GPU-daemon process that runs in a background of the distributed-computing programming framework and that facilitates the distributed-computing programming framework to share GPU resources between the tasks executing on the GPU by intercepting calls from a task executing on the GPU to create a GPU resource, and sharing previously-created GPU resources between the tasks executing on the GPU of the compute node when the call to create the GPU resource is redundant.

21. The method of claim 20, comprising:
creating, via the distributed-computing programming framework, a first resource in response to a request for the first resource by a first task, wherein the tasks comprise the first task and a second task, and wherein the GPU resources comprise the first resource;
detecting, via the GPU-daemon process, a request for the first resource the second task; and
reusing, via the GPU-daemon process, the first resource for the second task in response to detecting the request by the second task, and not recreating the first resource for the second task.

22. The method of claim 20, wherein the GPU resources comprise objects of the distributed-computing programming framework.

23. The method of claim 20, comprising mapping, via the distributed-computing programming framework, at least some of the tasks to the compute node.

24. The method of claim 20, wherein the distributed-computing programming framework comprises MapReduce.

25. The method of claim 20, wherein the compute node comprises a processor in addition to the GPU, and wherein the distributed computing system comprises multiple compute nodes.

* * * * *

UNITED STATES PATENT AND TRADEMARK OFFICE
CERTIFICATE OF CORRECTION

PATENT NO. : 10,970,805 B2  
APPLICATION NO. : 15/779368  
DATED : April 6, 2021  
INVENTOR(S) : Li et al.

Page 1 of 1

It is certified that error appears in the above-identified patent and that said Letters Patent is hereby corrected as shown below:

In the Claims

In Column 17, Line 42, in Claim 9, delete "CPU," and insert --GPU,-- therefor

In Column 17, Line 53, in Claim 12, delete "CPU" and insert --GPU-- therefor

In Column 17, Line 53, in Claim 12, delete "CPU" and insert --GPU-- therefor

In Column 17, Line 54, in Claim 12, delete "CPU" and insert --GPU-- therefor

In Column 17, Line 56, in Claim 12, delete "CPU" and insert --GPU-- therefor

In Column 17, Line 57, in Claim 12, delete "CPU" and insert --GPU-- therefor

In Column 18, Line 8, in Claim 15, delete "Map Reduce." and insert --MapReduce.-- therefor In Column 18, Line 43, in Claim 21, after "resource", insert --by--

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*